(12) United States Patent
Kerres et al.

(10) Patent No.: US 6,767,585 B2
(45) Date of Patent: Jul. 27, 2004

(54) IONICALLY AND COVALENTLY CROSS-LINKED POLYMERS AND POLYMER MEMBRANES

(75) Inventors: Jochen Kerres, Ostfildern (DE); Wei Zhang, Stuttgart (DE); Chy-Ming Tang, Weinheim (DE)

(73) Assignee: Universität Stuttgart (DE)

( * ) Notice: Subject to any disclaimer, the term of this patent is extended or adjusted under 35 U.S.C. 154(b) by 0 days.

(21) Appl. No.: 10/275,854

(22) PCT Filed: May 17, 2001

(86) PCT No.: PCT/EP01/05644

§ 371 (c)(1),
(2), (4) Date: May 12, 2003

(87) PCT Pub. No.: WO01/87992

PCT Pub. Date: Nov. 22, 2001

(65) Prior Publication Data

US 2003/0208014 A1 Nov. 6, 2003

(30) Foreign Application Priority Data

May 19, 2000 (DE) .......................... 100 24 576

(51) Int. Cl.[7] .................................................. B05D 3/02
(52) U.S. Cl. .................................. 427/350; 427/385.5
(58) Field of Search .............................. 427/385.5, 350

(56) References Cited

U.S. PATENT DOCUMENTS 4,833,219 A * 5/1989 Guiver et al. ............... 525/534

(List continued on next page.)

FOREIGN PATENT DOCUMENTS

DE 10019732 *10/2001

OTHER PUBLICATIONS

Kerres et al, GDCh—Monographien (2001), 23, pp 121–128, 2001.*

(List continued on next page.)

*Primary Examiner*—Erma Cameron
(74) *Attorney, Agent, or Firm*—Robert H. Hammer, III

(57) ABSTRACT

The present invention relates to ionically and covalently cross-linked polymers and polymer membranes having recurrent units of the general formula (1), wherein Q is a link, oxygen, sulfur, (2) or (3) and the R radical is a divalent radical of an aromatic or heteroaromatic compound, and which are characterized in that a) R radical comprises at least partially substituents of general formula (4A), (4B), (4C), (4D), (4E), (4F), (4G) and/or (4H), b) R radical comprises at least partially substituents of the general formula (5A) and/or (5B) and/or the R radical is at least partially a group of the general formula (5C) and/or (5D) and c) the R radical comprises at least partially bridges of the general formula (6) linking at least to R radicals together, $R_1$, $R_2$, $R_3$, $R_4$, $R_5$, M, X, Y, Z and m having the hereinmentioned meanings.

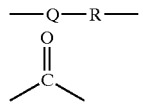

(1)

—Q—R—  (2)

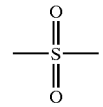

(3)

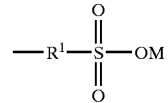

(4A)

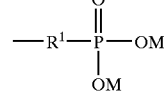

(4B)

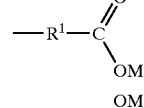

(4C)

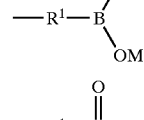

(4D)

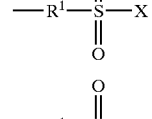

(4E)

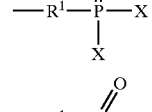

(4F)

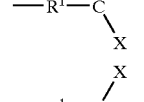

(4G)

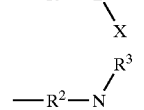

(4H)

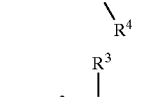

(5A)

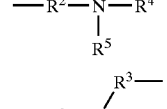

(5B)

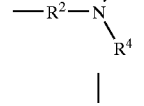

(5C)

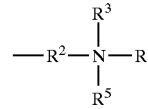

(5D)

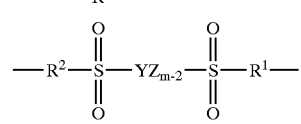

(6)

22 Claims, No Drawings

U.S. PATENT DOCUMENTS 5,438,082 A * 8/1995 Helmer-Metzmann et al. ......... 522/149
6,194,474 B1 * 2/2001 Kerres et al. .................. 521/27

FOREIGN PATENT DOCUMENTS

| EP | 8945 | * | 3/1980 |
| EP | 574791 | * | 12/1993 |
| WO | WO 00 66254 | * | 11/2000 |
| WO | WO 01 64773 | * | 9/2001 |
| WO | WO 01 84657 | * | 11/2001 |

* cited by examiner ical crosslinked polymers comprising repeating units of the general formula

—Q—R  (1)

in which Q is a bond, oxygen, sulfur,

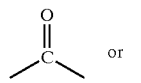 (2)

or

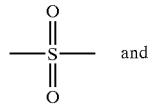 (3)

and the radical R is a divalent radical of an aromatic or heteroaromatic compound. The present invention further describes a process for preparing the covalently and ionically crosslinked polymers and also their use, particularly in fuel cells.

Polymers with repeating units of the general formula (I) are already known. They include, for example, polyarylenes, such as polyphenylene and polypyrene, aromatic polyvinyl compounds, such as polystyrene and polyvinylpyridine, polyphenylenevinylene, aromatic polyethers, such as polyphenylene oxide, aromatic polythioethers, such as polyphenylene sulfide, polysulfones, such as ®Radel R, and polyether ketones, such as PEK. Moreover, they also embrace polypyrroles, polythiophenes, polyazoles, such as polybenzimidazole, polyanilines, polyazulenes, polycarbazoles, and polyindophenines.

Recently, the use of such polymers for producing membranes for use in fuel cells has become increasingly important. Polymers with basic groups, such as sulfonic acid groups and amino groups, in particular, are increasingly being described in the literature. The membranes are doped with concentrated phosphoric acid or sulfuric acid and serve as proton conductors in what are known as polyelectrolyte membrane fuel cells (PEM fuel cells). Such membranes allow the membrane electrode assembly (MEA) to be operated at relatively high temperatures and so increase the tolerance of the catalyst significantly toward the carbon monoxide which is produced as a by-product in the reformation, thereby substantially simplifying the reprocessing or purification of gas. Disadvantages of these membranes are their mechanical instability, with a low modulus of elasticity, a low tensile strength, and a low upper flow limit, and their relatively high permeability to hydrogen, oxygen, and methanol.

First attempts to solve these problems are disclosed in the documents DE 196 22 337, WO 99/02755, and WO 99/02756. DE 196 22 337 describes a process for producing covalently crosslinked ionomer membranes which is based on an alkylation reaction of sulfinate-functional polymers, polymer blends, and polymer (blend) membranes. The covalent network is resistant to hydrolysis even at relatively high temperatures. A disadvantage, however, is that, owing to the hydrophobic covalent network, the covalently crosslinked ionomers and ionomer membranes dry out easily and may therefore undergo severe embrittlement; as a result, they are of only limited suitability for applications in fuel cells, especially at relatively high temperatures.

The documents WO 99/02756 and WO 99/02755 disclose ionically crosslinked acid-base polymer blends and polymer (blend) membranes. One advantage of the ionically crosslinked acid-base blend membranes is that the ionic bonds are flexible, even at relatively high temperatures the polymers/membranes do not dry out so easily, owing to the hydrophilicity of the acid-base groups, and therefore the polymers/membranes do not undergo embrittlement even at relatively high temperatures. The ionically crosslinked ionomer (membrane) systems described in these documents, however, have the disadvantage that the ionic bonds part in the temperature range between 60 and 90° C. and from this temperature range on the polymers/membranes begin exorbitantly to swell. Consequently, these membranes too are poorly suited to applications in fuel cells, especially at relatively high temperatures upward of 80° C.

In the light of the prior art it is now an object of the present invention to provide a crosslinked polymer having improved properties. The polymer of the invention is to have a low specific volume resistance, preferably less than or equal to 100 Ωcm at 25° C., and to exhibit low permeability for hydrogen, oxygen, and methanol.

Furthermore, it is to have a very good mechanical stability, in particular an improved modulus of elasticity, a higher tensile strength, and improved swelling properties. It should preferably swell by less than 100% in deionized water at a temperature of 90° C.

A further object was to specify a crosslinked polymer which can be used in fuel cells. The crosslinked polymer ought in particular to be suitable for use in fuel cells upward of 80° C., in particular upward of 100° C.

A further object of the invention was to provide a process for preparing the crosslinked polymer that can be carried out simply, inexpensively, and on an industrial scale.

These objects and further objects, which are not mentioned explicitly but can readily be derived or inferred from the circumstances discussed introductorily herein, are achieved by means of a covalently and ionically crosslinked polymer having all of the features of claim 1. Appropriate modifications of the crosslinked polymer of the invention are protected in the subclaims which refer back to claim 1. Processes for preparing the crosslinked polymer of the invention are described in the process claims, while the claims of the use category protect preferred uses of a crosslinked polymer of the invention.

By virtue of the fact that a covalently and ionically crosslinked polymer comprising repeating units of the general formula (I) is made available which is distinguished in that a) the radical R has at least in part substituents of the general formula (4A), (4B), (4C), (4D), (4E), (4F), (4G) and/or (4H)

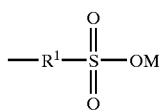 (4A)

-continued

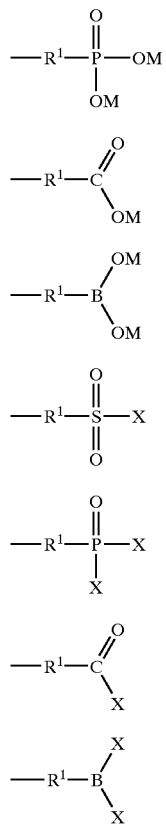
(4B)
(4C)
(4D)
(4E)
(4F)
(4G)
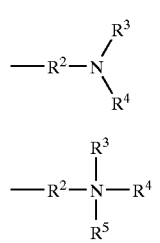
(4H)

where the radicals $R^1$ independently of one another are a bond or a group having 1 to 40 carbon atoms, preferably a branched or unbranched alkyl or cycloalkyl group or an optionally alkylated aryl group, M is hydrogen, a metal cation, preferably $Li^+$, $Na^+$, $K^+$, $Rb^+$, $Cs^+$, or an optionally alkylated ammonium ion, and X is a halogen or an optionally alkylated amino group, b) the radical R has at least in part substituents of the general formula (5A) and/or (5B)

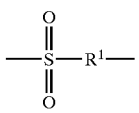
(5A)

(5B)

in which $R^2$, $R^3$, $R^4$ and $R^5$ independently of one another are a group having from 1 to 40 carbon atoms, preferably a branched or unbranched alkyl or cycloalkyl group or an optionally alkylated aryl group, it being possible for at least two of the radicals $R^2$, $R^3$, and $R^4$ to be closed to form an optionally aromatic ring, and/or the radical R is at least in part a group of the general formula (5C) and/or (5D)

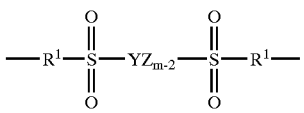
(5C)

(5D)

and c) the radical R has at least in part bridges of the general formula (6)

(6)

which join at least two radicals R to one another,

Y being a group having from 1 to 40 carbon atoms, preferably a branched or unbranched alkyl or cycloalkyl group or an optionally alkylated aryl group, Z is hydroxyl, a group of the general formula (7)

or a group having a molecular weight of more than 20 g/mol, composed of the optional components H, C, O, N, S, P, and halogen atoms, and m is an integer greater than or equal to 2, it is possible in a manner which was not immediately foreseeable to make available a crosslinked polymer having improved mechanical properties, in particular a higher modulus of elasticity, an improved tensile strength, and improved swelling properties.

At the same time the crosslinked polymer of the invention display a number of further advantages. These include, among others:

The doped polymer membranes have a low specific volume resistance, preferably less than or equal to 100 Ωm at 25° C.

The doped polymer membranes possess only a low permeability for hydrogen, oxygen and methanol.

Even an extremely thin membranes of the crosslinked polymer of the invention, with a total thickness of between 10 and 100 μm, possess sufficiently good material properties at 80° C., in particular a very high mechanical stability and a low permeability for hydrogen, oxygen and methanol.

The doped polymer membrane is suitable for use in fuel cells upward of 80° C., in particular under standard pressure.

The doped polymer membrane can be produced simply, on an industrial scale, and inexpensively.

In accordance with the present invention the polymer is ionically and covalently crosslinked. In accordance with the invention, crosslinked polymers are those polymers whose linear or branched macromolecules, which are of the same or different chemical identity and are present in the form of collectives, are linked to one another to form three-dimensional polymer networks. In this case the crosslinking may be effected both by way of the formation of covalent bonds and by way of the formation of ionic bonds. Further details may be taken from the technical literature, examples being C D Römpp Chemie Lexikon—Version 1.0, Stuttgart/ New York: Georg Thieme Verlag 1995, entry on "Crosslinking" and the literature cited in that section.

The crosslinked polymer of the invention has repeating units of the general formula (1), especially repeating units corresponding to the general formulae (1A), (1B), (1C), (1D), (1E), (1F), (1G), (1H), (1), (1J), (1K), (1L), (1M), (1N), (1O), (1P), (1Q), (1R), (1S) and/or (1T):

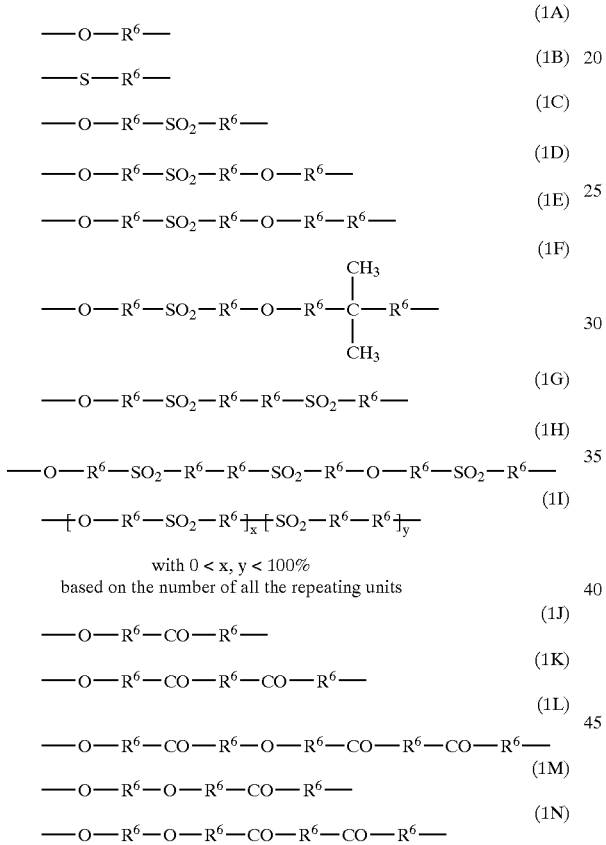

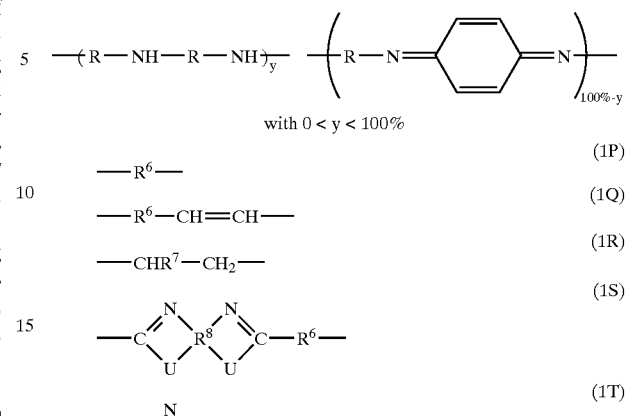

Independently of one another here the radicals $R^6$ which are identical or different, are 1,2-phenylene, 1,3-phenylene, 1,4-phenylene, 4,4'-biphenyl, a divalent radical of a heteroaromatic, a divalent radical of a $C_{10}$ aromatic, a divalent radical of a $C_{14}$ aromatic and/or a divalent pyrene radical. An example of a $C_{10}$ aromatic is naphthalene; of a $C_{14}$ aromatic, phenanthrene. The substitution pattern of the aromatic and/or heteroaromatic is arbitrary, in the case of phenylene, for example, $R^6$ may be ortho-, meta- and para-phenylene.

The radicals $R^7$, $R^8$, and $R^9$ designate monovalent, tetravalent and trivalent aromatic or heteroaromatic groups, respectively, and the radicals U, which are identical within a repeating unit, are an oxygen atom, a sulfur atom or an amino group which carries a hydrogen atom, a group having 1–20 carbon atoms, preferably a branched or unbranched alkyl or alkoxy group, or an aryl group as a further radical.

The polymers with repeating units of the general formula (1) that are particularly preferred in the context of the present invention include homopolymers and copolymers, examples being random copolymers, such as ®Victrex 720 P and ®Astrel. Especially preferred polymers are polyaryl ethers, polyaryl thioethers, polysulfones, polyether ketones, polypyrroles, polythiophenes, polyazoles, phenylenes, polyphenylenevinylenes, polyanilines, polyazulenes, polycarbazoles, polypyrenes, polyindophenines and polyvinylpyridines, especially polyaryl ethers:

Polyphenylene oxide

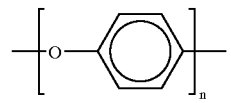
(1A-1)

Polyaryl thioethers:
Polyphenylene sulfide

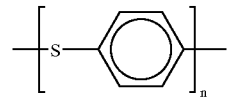
(1B-1)

Polysulfones:
®Victrex 200 P

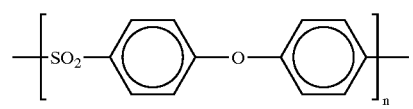
(1C-1)

®Victrex 720 P (1I-1)
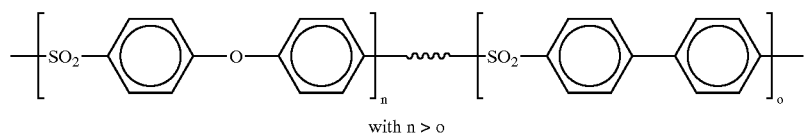
with n > o
®Radel (1G-1)
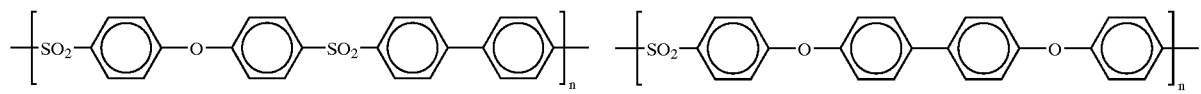
®Radel R (1E-1)
®Victrex HTA (1H-1)
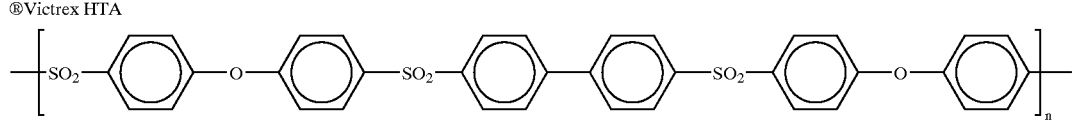
®Astrel (1I-2)
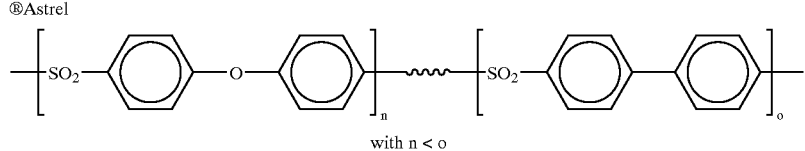
with n < o
®Udel (1F-1)
Polyether ketones:
PEK (1J-1)
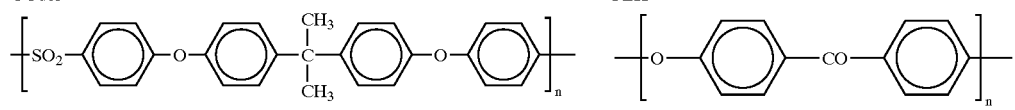
PEKK (1K-1)
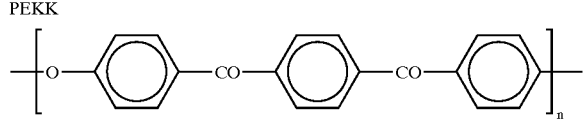
PEKEKK (1L-1)
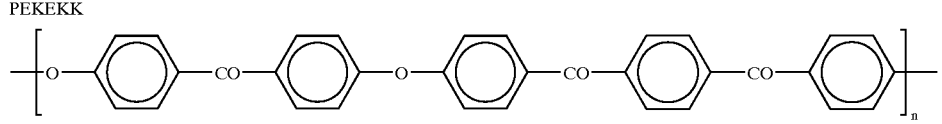
PEEK (1M-1)
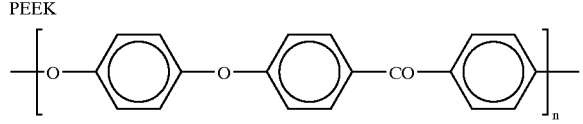
PEEKK (1N-1)
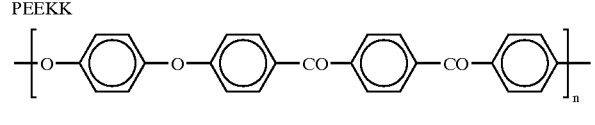
Polypyrroles: (1P-1)
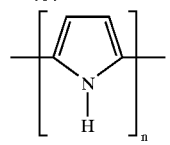
Polythiophenes: (1P-2)
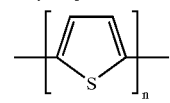

-continued

Polyazoles:
Polybenzimidazole (1S-1)

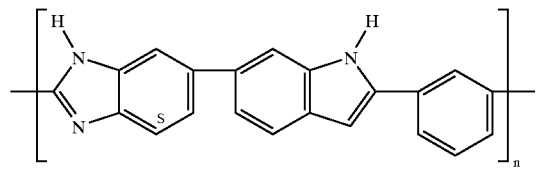

Polyphenylenes: (1P-3)

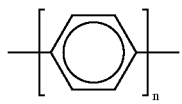

Polyphenylenevinylene: (1Q-1)

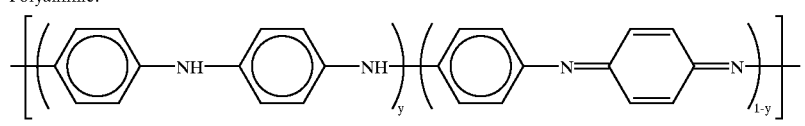

Polyaniline: (1O-1)

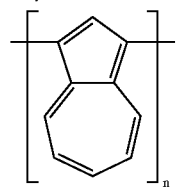

Polyazulene: (1P-4)

Polycarbazole: (1P-5)

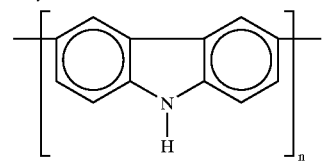

Polypyrene: (1P-6)

Polyindophenines: (1P-7)

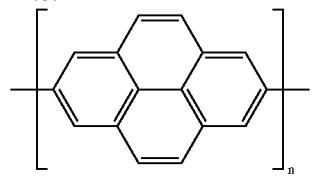

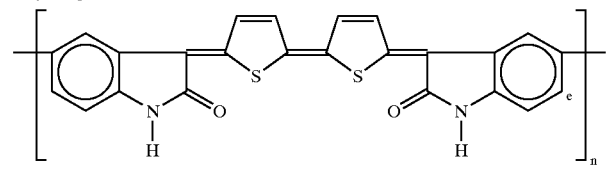

Polyvinylpyridine: (1R-1) (1R-2)

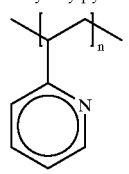

(1R-3)

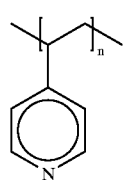

Especially preferred in accordance with the invention are crosslinked polymers with repeating units of the general formula (1A-1), (1B-1), (1C-1), (1I-1), (1G-1), (1E-1), (1H-1), (1I-1), (1F-1), (1J-1), (1K-1), (1L-1), (1M-1) and/or (1N-1).

In the context of the present invention, n designates the number of repeating units along one macromolecule chain of the crosslinked polymer. This number of the repeating units of the general formula (1) along one macromolecule chain of the crosslinked polymer is preferably an integer greater than or equal to 10, in particular greater than or equal to 100. The number of repeating units of the general formula (1A), (1B), (1C), (1D), (1E), (1F), (1G), (1H), (1I), (1J), (1K), (1L), (1M), (1N), (1O), (1P), (1Q), (1R), (1S) and/or (1T) along one macromolecule chain of the crosslinked polymer is preferably an integer greater than or equal to 10, in particular greater than or equal to 100.

In one particularly preferred embodiment of the present invention, the numerical average of the molecular weight of the macromolecule chain is greater than 25,000 g/mol, appropriately greater than 50,000 g/mol, in particular greater than 100,000 g/mol.

The crosslinked polymer of the invention may in principle also contain different repeating units along a macromolecule chain. Preferably, however, along one macromolecule chain it contains only identical repeating units of the general formula (1A), (1B), (1C), (1D), (1E), (1F), (1G), (1H), (1I), (1J), (1K), (1L), (1M), (1N), (1O), (1P), (1Q), (1R), (1S) and/or (1T).

In the context of the present invention the radical R has at least in part substituents of the general formula (4A), (4B), (4C), (4D), (4E), (4F), (4G) and/or (4H), preferably of the general formula (4A), (4B), (4C) and/or (4D), appropriately of the general formula (4A), (4B) and/or (4C), in particular of the general formula (4A):

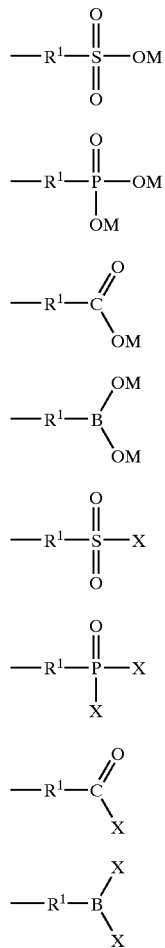

Here, the radicals $R^1$ independently of one another designate a bond or a group having from 1 to 40 carbon atoms, preferably a branched or unbranched alkyl or cycloalkyl group or an optionally alkylated aryl group. In the context of one especially preferred embodiment of the present invention, $R^1$ is a bond.

M stands for hydrogen, a metal cation, preferably $Li^+$, $Na^+$, $K^+$, $Rb^+$, $Cs^+$, or an optionally alkylated ammonium ion, appropriately for hydrogen or $Li^+$, in particular for hydrogen.

X is a halogen or an optionally alkylated amino group.

Moreover, in accordance with the invention, the radical R has at least in part substituents of the general formula (5A) and/or (5B), preferably (5A)

and/or the radical R is at least in part a group of the general formula (5C) and/or (5D), preferably (5C).

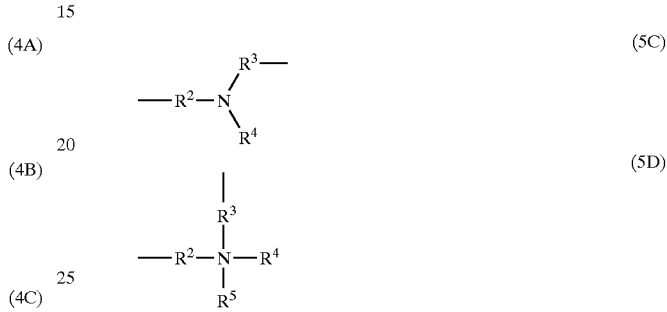

In this context the radicals $R^2$, $R^3$, $R^4$ and $R^5$ independently of one another denote a group having from 1 to 40 carbon atoms, preferably a branched or unbranched alkyl or cycloalkyl group or an optionally alkylated aryl group, it being possible for at least two of the radicals $R^2$, $R^3$ and $R^4$ to be closed to form an optionally aromatic ring.

Particularly advantageous effects can be achieved if R has at least in part substituents of the general formula (5A-1) and/or (5A-2).

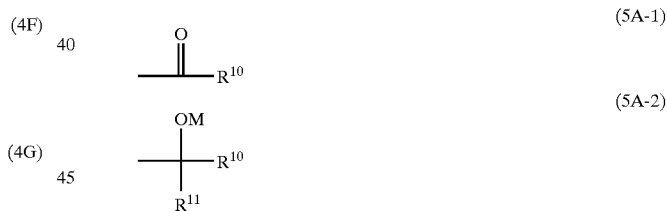

Here, the radicals $R^{10}$ denotes an optionally alkylated aryl group, which contains at least one optionally alkylated amino group, or an optionally alkylated heteroaromatic, which either has at least one optionally alkylated amino group or has at least one nitrogen atom in the heteroaromatic nucleus. $R^{11}$ is hydrogen, an alkyl, cycloalkyl, aryl or heteroaryl group or a radical $R^{10}$ with the definition specified above, it being possible for $R^{10}$ and $R^{11}$ to be identical or different.

Especially preferred in accordance with the invention are substituents of the formula (5A-1) in which $R^{10}$ is an optionally alkylated aniline radical or pyridine radical, preferably an alkylated aniline radical. Moreover, particular preference is also given to substituents of the formula (5A-2) in which $R^{10}$ and $R^{11}$ are optionally alkylated aniline radicals or pyridine radicals, preferably alkylated aniline radicals.

In the context of the present invention the radical R has at least in part bridges of the general formula (6)

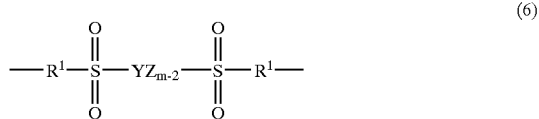

which join at least two radicals R to one another, Y being a group having 1 to 40 carbon atoms, preferably a branched or unbranched alkyl or cycloalkyl group or optionally alkylated aryl group, appropriately a linear or branched alkyl group containing from 1 to 6 carbon atoms.

Z designates hydroxyl, a group of the general formula

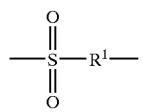

or a group having a molecular weight of more than 20 g/mol composed of the optional components H, C, O, N, S, P and halogen atoms, and m stands for an integer greater than or equal to 2, preferably 2.

The crosslinked polymer of the invention is preferably are doped with acid. In the context of the present invention, doped polymers are those polymers which owing to the presence of doping agents exhibit an increased proton conductivity in comparison with the undoped polymers. Dopants for the polymers of the invention are acids. Acids in this context embrace all known Lewis and Brønsted acids, preferably inorganic Lewis and Brønsted acids. Also possible is the use of polyacids, especially isopolyacids and heteropolyacids, and mixtures of different acids. For the purposes of the present invention, heteropolyacids are inorganic polyacids having at least two different central atoms which are formed as partial mixed anhydrides from in each case weak polybasic oxygen acids of a metal (preferably Cr, Mo, V, W) and of a nonmetal (preferably As, I, P, Se, Si, Te). They include, among others, 12-molybdatophosphoric acid and 12-tungstophosphoric acid.

Dopants which are particularly preferred in accordance with the invention are sulfuric acid and phosphoric acid. One especially preferred dopant is phosphoric acid ($H_3PO_4$).

By way of the degree of doping it is possible to influence the conductivity of the polymer membrane of the invention. As the concentration of dopant goes up, the conductivity increases until a maximum is reached. In accordance with the invention, the degree of doping is reported as mole acid per mole repeating unit of the polymer. In the context of the present invention a degree of doping of between 3 and 15, in particular between 6 and 12, is preferred.

Processes for preparing doped polymer membrane are known. In one preferred embodiment of the present invention they are obtained by wetting a polymer of the invention for an appropriate time, preferably 0.5–96 hours, with particular preference 1–72 hours, at temperatures between room temperature and 100° C. and, where appropriate, under elevated pressure with concentrated acid, preferably with highly concentrated phosphoric acid.

The spectrum of properties of the crosslinked polymer of the invention can be modified by varying its ion exchange capacity. The ion exchange capacity lies preferably between 0.5 meq/g and 1.9 meq/g, based in each case on the total mass of the polymer.

The polymer of the invention has a low specific volume resistance, preferably of not more than 100 Ωcm, appropriately of not more than 50 Ωcm, in particular of not more than 20 Ωcm, in each case at 25° C.

The properties of the polymer membrane of the invention may be controlled in part by its total thickness. Nevertheless, even extremely thin polymer membranes possess very good mechanical properties and relatively low permeability for hydrogen, oxygen, and methanol. They are therefore suitable for use in fuel cells upward of 80° C., appropriately upward of 100° C., and in particular for use in fuel cells upward of 120° C., without it being necessary to reinforce the edge region of the membrane electrode assembly. The total thickness of the doped polymer membrane of the invention is preferably between 50 and 100 μm, appropriately between 10 and 90 μm, in particular between 20 and 80 μm.

In the context of one especially preferred embodiment of the present invention it swells by less than 100% in deionized water at a temperature of 90° C.

Processes for preparing the crosslinked polymer of the invention are obvious to the person skilled in the art. Nevertheless, in the context of the present invention a procedure which has proven especially suitable is that in which one or more precursor polymers which individually or in toto contain the functional groups a), b) and d), d) designating sulfinate groups of the general formula (6)

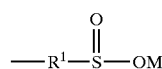

is or are reacted with a compound of the general formula (7)

where L is a leaving group, preferably an F, Cl, Br, I, tosylate, and n is an integer greater than or equal to 2, preferably 2. Each precursor polymer preferably has repeating units of the general formula (1). Furthermore, appropriately, it is not covalently crosslinked.

Where in at least one precursor polymer the radical R has at least in part substituents of the general formula (5A) or is at least in part a group of the general formula (5C), the reaction with the compound (7) may also, moreover, lead to the formation of bridges of the general formula (8) and/or (9).

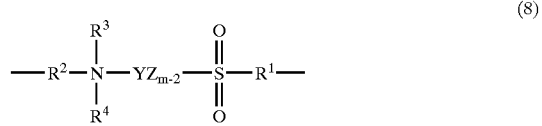

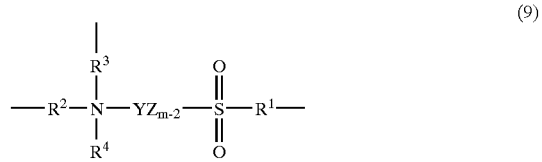

Also conceivable is the formation of bridges between different substituents of the general formula (5A) and/or between different groups of the general formula (5C).

In one particularly preferred embodiment of the present invention a polymer mixture is used comprising
1) at least one precursor polymer having functional groups a),
2) at least one precursor polymer having functional groups b), and 3) at least one precursor polymer having functional groups d).

In another particularly preferred embodiment of the present invention a polymer mixture is used comprising 1) at least one precursor polymer having functional groups a) and b) and
2) at least one precursor polymer having functional groups d).

In accordance with another particularly preferred embodiment of the present invention it may also be particular advantageous to use a polymer mixture comprising 1) at least one precursor polymer having functional groups a) and d) and
2) at least one precursor polymer having functional groups b).

Furthermore, processes wherein use is made of a polymer mixture comprising 1) at least one precursor polymer having functional groups a) and
2) at least one precursor polymer having functional groups b) and d)

also constitutes a particularly preferred embodiment of the present invention.

In accordance with the invention it may also be exceptionally appropriate to use at least one polymer having functional groups of the general formula a), b) and d).

The precursor polymer or polymers for use in accordance with the invention may in principle have different repeating units of the general formula (1). Preferably, however, they have only identical repeating units of the general formula (1A), (1B), (1C), (1D), (1E), (1F), (1G), (1H), (1I), (1J), (1K), (1L), (1M), (1N), (1O), (1P), (1Q), (1R), (1S) and/or (1T).

The number of repeating units of the general formula (1A), (1B), (1C) (1D), (1E), (1F), (1G) (1H), (1I), (1J), (1K), (1L), (1M), (1N), (1O), (1P), (1Q) (1R), (1S) and/or (1T) is preferably an integer greater than or equal to 10, preferably at least 100 repeating units.

In one particularly preferred embodiment of the present invention the numerical average of the molecular weight of the precursor polymer or polymers is greater than 25,000 g/mol, appropriately greater than 50,000 g/mol, in particular greater than 100,000 g/mol.

The synthesis of the precursor polymers having functional groups of the general formula a), b) and/or d) is already known. It can take place, for example, by reacting a polymer of the general formula (1) with n-butyllithium in a dried aprotic solvent, preferably tetrahydrofuran (THF), under an inert gas atmosphere, preferably argon, and so lithiating it.

In order to introduce the functional groups, the lithiated polymer is [lacuna] in a manner known per se with suitable functionalizing agents, preferably with alkylating agent of the general formula L-Subst. (10)

where Subst. is the substituent to be introduced; with ketones and/or aldehydes, which are reacted to the corresponding alkoxides; and/or with carboxylic esters and/or carbonyl halides, which are reacted to the corresponding ketones. The introduction of sulfonate groups may also be effected by reacting the lithiated polymer with $SO_3$, and the introduction of sulfinate groups by reacting the lithiated polymer with $SO_2$.

Through successive reaction with two or more different functionalizing agents, polymers are obtained which have at least two different substituents.

For further details, refer to the state of the art, in particular to the documents U.S. Pat. No. 4,833,219, J. Kerres, W. Cui, S. Reichle; New sulfonated engineering polymers via the melation route. 1. Sulfonated poly-(ethersulfone) PSU Udel® via metalation-sulfination-oxidation" J. Polym. Sci.: Part A: Polym. Chem. 34, 2421–2438 (1996), WO 00/09588 A1, whose disclosure content is hereby explicitly incorporated by reference.

The degree of functionalization of the precursor polymers lies preferably in the range from 0.1 to 3 groups per repeating unit, preferably between 0.2 and 2.2 groups per repeating unit. Particular preference is given to precursor polymers having from 0.2 to 0.8 groups a), preferably sulfonate groups, per repeating unit. Moreover, precursor polymers having from 0.8 to 2.2 groups b) per repeating unit have been found particularly appropriate. Moreover, particularly advantageous results are achieved with precursor polymers which have from 0.8 to 1.3 groups d) per repeating unit.

In the context of the present invention it has proven especially appropriate to dissolve the precursor polymer or polymers in a dipolar-aprotic solvent, preferably in N,N-dimethylformamide, N,N-dimethyl-acetamide, N-methylpyrrolidone, dimethyl sulfoxide or sulfolane, and to react the solution with the halogen compound, with stirring.

Particularly advantageous results can be achieved here if a) the polymer solution is spread as a film on a substrate, preferably on a glass plate or a woven or nonwoven fabric, and b) the solvent is evaporated, where appropriate at an elevated temperature of more than 25° C. and/or under a reduced pressure of less than 1000 mbar, to give a polymer membrane.

The properties of the polymer of the invention may also be enhanced by a) treating the polymer in a first step with an acid and b) treating the polymer in a further step with deionized water, the polymer being treated where appropriate with an aqueous alkali prior to the first step.

Possible fields of use for the covalently and ionically crosslinked polymer of the invention are evident to the skilled worker. It is particularly suitable for all applications which are indicated for crosslinked polymers having low specific volume resistances, preferably less than 100 Ωcm at 25° C. On the basis of their characteristic properties, they are suitable in particular for applications in electrochemical cells, preferably in secondary batteries, electrolysis cells, and in polymer electrolyte membrane fuel cells, especially in hydrogen fuel cells and direct methanol fuel cells.

Moreover, they may also be employed to particular advantage in membrane separation operations, preferably in the context of gas separation, pervaporation, perstraction, reverse osmosis, nanofiltration, electrodialysis, and diffusion dialysis.

The invention is illustrated in more detail below using examples and comparative examples, without any intention that the teaching of the invention should be restricted to these examples. The property values reported, like the values described above, were determined as follows:

In order to determine the ion exchange capacity, IEC, a piece of protonated ionomer membrane was dried to constant weight. 1 mg of the membrane was introduced into about 50 ml of saturated NaCl solution. As a result, there was ion exchange of the sulfonate groups, with the H$^+$ ions passing into the saturated solution. The solution with the membrane was shaken or stirred for about 24 hours. Thereafter, 2 drops of the indicator bromothymol blue were added to the solution, which was titrated with 0.1-normal NaOH solution until the change of color from yellow to blue. The IEC was calculated as follows:

$IEC$[meq/g]=(normality of NaOH[meq/ml]*consumption of NaOH [ml]*factor of NaOH)/mass of membrane[g]

The specific volume resistance $R^{sp}$ of the membranes was determined by means of impedance spectroscopy (IM6 impedance meter, Zahner elektrik) in a Plexiglas unit with gold-coated copper electrodes (electrode area 0.25 cm$^2$). Here, in accordance with the invention, the impedance at which the phase angle between current strength and voltage was 0 designates the specific volume resistance. The actual measurement conditions were as follows: 0.5 N HCl was used, the membrane under measurement was packed between two Nafion 117 membranes, and the multilayer arrangement of Nafion 117/membrane/Nafion 117 membrane was pressed between the two electrodes. In this way, the interfacial resistances between membrane and electrode were eliminated by measuring first of all the multilayer arrangement of all three membranes and then the two Nafion 117 membranes alone. The impedance of the Nafion membranes was substrated from the impedance of all three membranes. In the context of the present invention the specific volume resistances were determined at 25° C.

In order to determine the swelling, the membranes were equilibrated in deionised water at the respective temperature and then weighed (=m$^{swollen}$). The membranes were then dried at elevated temperature in a drying oven and weighed again (=m$^{dry}$). The degree of swelling is calculated as follows:

$Q=(m^{swollen}-m^{dry})/m^{dry}$ a) polymers used a-1) PSU Udel®

PSU P 1800 (Amoco)

a-2) PEK-SO$_3$Li:

Lithium salt of sulfonated polyether ketone PEK;

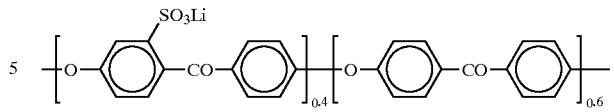

Preparation:

100 g of PEK-SO$_3$H having an ion exchange capacity of 1.8 meq SO$_3$H/g polymer were stirred for 24 hours in 1000 ml of a 10% strength by weight aqueous LiOH solution. Thereafter the Li-exchanged PEK-SO$_3$Li was filtered off, washed with water until the wash water gave a neutral reaction, and then dried at 100° C. for 48 h. The resulting polymer contained 0.4 SO$_3$Li units per repeating unit (ion exchange capacity (IEC) of the protonated form=1.8 meq SO$_3$H/g).

a-3) PSU-SO$_2$Li:

Lithium salt of sulfinated polyether sulfone PSU Udel®

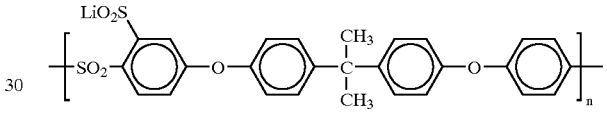

obtained in accordance with U.S. Pat. No. 4,833,219 or J. Kerres, W. Cui, S. Reichle; New sulfonated engineering polymers via the melation route. 1. Sulfonated poly (ethersulfone) PSU Udel® via metalation-sulfination-oxidation" J. Polym. Sci.: Part A: Polym. Chem. 34, 2421–2438 (1996) IEC of the protonated form=1.95 meq SO$_2$Li/g a-4) PSU-DPK:

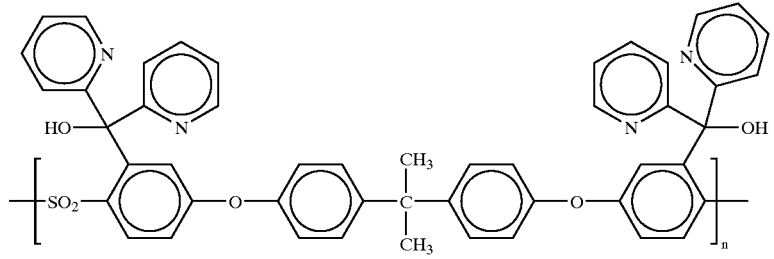

obtained by reacting 2,2'-dipyridyl ketone with lithiated PSU Udel (in accordance with WO 00/09588 A1);

one 2,2'-dipryidyl ketone unit per repeating unit.

a-5) Synthesis of PSU-P3-SO₂Li, PSU-EBD-SO₂Li PSU-P3-SO₂Li,

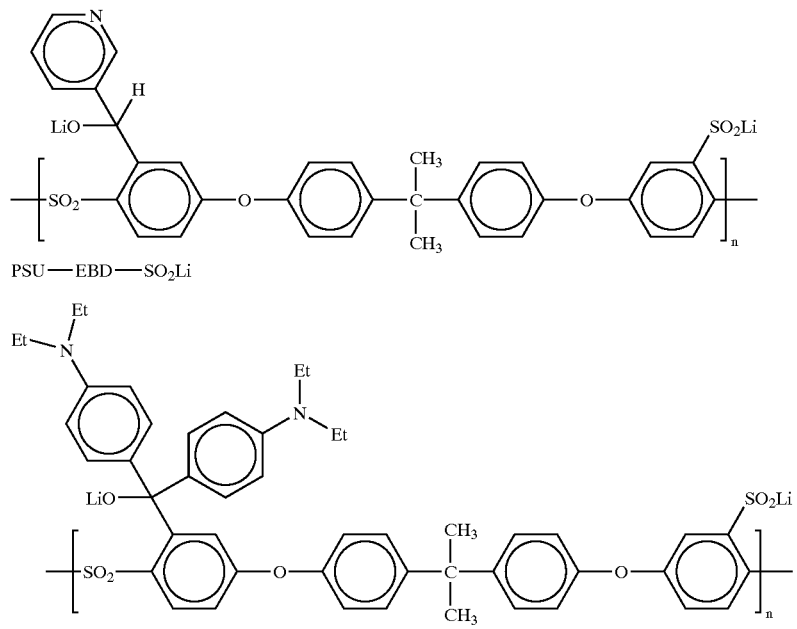

First of all PSU Udel® was dissolved in dry THF and the solution was cooled to −75° C. under argon. Traces of water in the reaction mixture were removed with 2.5 M n-butyllithium (n-BuLi). The dissolved polymer was subsequently lithiated with 10 M n-BuLi. The batch was left to react for one hour and then pyridine-3-aldehyde or 4,4'-bis(N,N-diethylamino)benzo-phenone was added. The reaction temperature was thereafter raised to −20° C. for one hour. For the reaction with SO₂ it was subsequently cooled again to −75° C. and the SO₂ was passed in.

For working up, 10 ml of an isopropanol/water mixture was introduced by syringe into the reaction solution, which was heated to room temperature, and the polymer was precipitated in an excess of isopropanol, and the resulting polymer was filtered off and washed, where appropriate with isopropanol. For purification, the polymer was suspended in methanol and filtered off again. The polymer was dried in vacuo, preferably at 80° C. The degrees of substitution were obtained by quantitative evaluation of the ¹H-NMR spectra.

TABLE 1

Synthesis of PSU-P3-SO₂Li and PSU-EBD-SO₂Li

| Batch | | Degree of substitution per repeating unit |
|---|---|---|
| PSU-P3-SO₂Li | 10 ml 10 M BuLi<br>1000 ml THF<br>22.1 g PSU Udel ®<br>5.35 g pyridine-3-aldehyde<br>SO₂ | 0.8 pyridine-3-aldehyde<br>1.2 SO₂Li |
| PSU-DEB-SO₂Li | 10 ml 10 M BuLi<br>1000 ml THF<br>22.1 g PSU Udel ®<br>16.22 g 4,4'-bis- | 0.4 4,4-Bis(N,N-diethylamino)benzo phenone<br>1.6 SO₂Li |

TABLE 1-continued

Synthesis of PSU-P3-SO₂Li and PSU-EBD-SO₂Li

| Batch | Degree of substitution per repeating unit |
|---|---|
| (N,N-diethylamino)-benzophenone SO₂ | | b.) Membrane Production

The polymers PEK-SO₃Li, PSU-P3-So₂Li, PSU-EBD-SO₂Li, PSU-DPK and/or PSUSO₂Li were dissolved in NMP in accordance with Table 2 and filtered. The polymer solution was then degassed in vacuo and subsequently admixed with 1,4-diiodobutane. It was subsequently poured onto a glass plate and drawn but using a doctor blade. The glass plate was dried in an oven at 60° C. for 1 hour, then at 90° C. for a further hour and finally at 120° C. under vacuum overnight. The plate was cooled to room temperature and placed in a waterbath. The membrane was separated from the glass plate and stored in 10% HCl in an oven at 90° C. for one day. It was subsequently conditioned in deionized water at 60° C.

c.) Characterization of the Membranes

The characteristic data of the membranes are summarized in Tables 2 and 3. The theoretical ion exchange capacity $IEC^{theo}$ was calculated taking into account both the ionic and the covalent crosslinking. From Table 3 it is evident that the covalently and ionically crosslinked membranes have much lower swelling figures than the purely ionically crosslinked membranes, and this is so even at temperatures of 90° C.

TABLE 2

Membrane characteristic data

| Membrane | Composition | Thickness [μm] | $IEC^{exp}$ [meq/g] | $IEC^{theo}$ [meq/g] | $R^{sp}$ [Ωcm] |
|---|---|---|---|---|---|
| Example 1 (wz054) | 0.77 g PSU-EBP 2.0 g PEK-SO₃Li 0.6 g 1,4-diiodobutane | 64 | 1.03 | 1.09 | 6.87 |
| Example 2 (wz051) | 0.77 g PSU-Pe 2.0 g PEK-SO₃Li 0.48 g 1,4-diiodobutane | 87 | 0.81 | 0.88 | 3.62 |
| Example 3 (wz40) | 3 g PEK-SO₃Li 0.3 g PSUSO₂Li 0.3 g PSU-DPK 0.205 ml 1,4-diiodobutane | 113 | 1.43 | 1.4 | 13.4 |
| Example 4 (wz40R) | 1 g PEK-SO₃Li 0.3 g PSUSO₂Li 0.3 g PSU-DPK 0.205 ml 1,4-diiodobutane | 52 | 0.86 | 0.89 | 35.96 |
| Comparative 1 (wz43) | 3 g PEK-SO₃Li 0.3 g PSU-DPK | 126 | 1.52 | 1.52 | 7.8 |
| Comparative 2 (wz43R) | 1 g PEK-SO₃Li 0.5 g PSU-DPK | 56 | 0.92 | 0.79 | 24.5 |
| Comparative 3 | PEK-SO₃H | 82 | 1.63 | 1.8 | 7.13 |

$IEC^{exp}$: experimentally determined ion exchange capacity
$R^{SP}$: specific volume resistance

TABLE 3

Swelling characteristics of the membranes in water as a function of temperature

| | Swelling in [%] | | | |
|---|---|---|---|---|
| Membrane | 25° C. | 40° C. | 60° C. | 90° C. |
| Example 1 (wz054) | 40.79 | 46.05 | 46.05 | 59.21 |
| Example 2 (wz051) | 38.46 | 44.61 | 44.61 | 61.54 |
| Example 3 (wz40) | 42 | 42.48 | 58.41 | 151.33 |
| Example 4 (wz40R) | 22.9 | 27.1 | 29.2 | 35.9 |
| Comparative 1 (wz43) | 95.9 | 110.4 | 161.09 | 224.43 |
| Comparative 2 (wz43R) | 29 | 33.77 | 34.2 | 48.05 |
| Comparative 3 PEK-SO₃H | 107.32 | 122 | 129.27 | 139.02 |

What is claimed is:

1. A covalently and ionically crosslinked polymer, having repeating units of the general formula

—Q—R—  (1)

in which Q is: a bond; oxygen; sulfur;

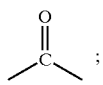  (2)

or

  (3)

and, the radical R is a divalent radical of an aromatic or heteroaromatic compound, characterized in that (a) the radical R has at least in part substituents of the general formula (4A), (4B), (4C), (4D), (4E), (4F), (4G) and/or (4H)

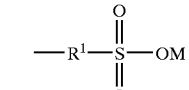  (4A)

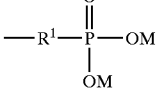  (4B)

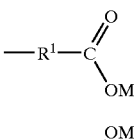  (4C)

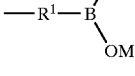  (4D)

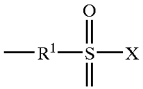  (4E)

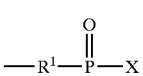  (4F)

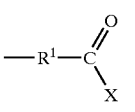  (4G)

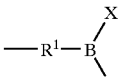  (4H)

where the radicals $R^1$ independently of one another are a bond or a group having 1 to 40 carbon atoms, preferably a branched or unbranched alkyl or cycloalkyl group or an optionally alkylated aryl group, M is hydrogen, a metal cation, preferably Li⁺, Na⁺, K⁺, Rb⁺, Cs⁺, or an optionally alkylated ammonium ion, and X is a halogen or an optionally alkylated amino group, (b) the radical R has at least in part substituents of the general formula (5A) and/or (5B)

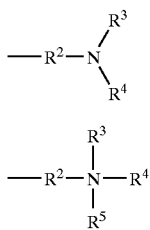
(5A)

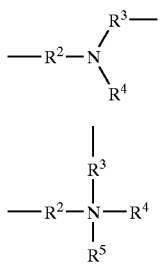
(5B)

in which $R^2$, $R^3$, $R^4$ and $R^5$ independently of one another are a group having from 1 to 40 carbon atoms, preferably a branched or unbranched alkyl or cycloalkyl group or an optionally alkylated aryl group, it being possible for at least two of the radicals $R^2$, $R^3$, and $R^4$ to be closed to form an optionally aromatic ring, and/or the radical R is at least in part a group of the general formula (5C) and/or (5D)

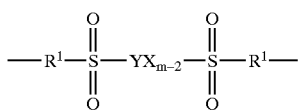
(5C)

(5D)

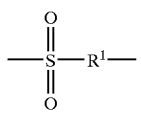

and (c) the radical R has at least in part bridges of the general formula (6)

$$—R^1—\overset{\overset{O}{\|}}{\underset{\underset{O}{\|}}{S}}—YX_{m-2}—\overset{\overset{O}{\|}}{\underset{\underset{O}{\|}}{S}}—R^1—$$
(6)

which join at least two radicals R to one another, Y being a group having from 1 to 40 carbon atoms, preferably a branched or unbranched alkyl or cycloalkyl group or an optionally alkylated aryl group, Z is hydroxyl, a group of the general formula $$—\overset{\overset{O}{\|}}{\underset{\underset{O}{\|}}{S}}—R^1—$$
(7)

or a group having a molecular weight of more than 20 g/mol, composed of the optional components H, C, O, N, S, P, and halogen atoms, and m is an integer greater than or equal to 2.

2. The polymer of claim 1, characterized in that the repeating units of the general formula (1) are units corresponding to the general formulae (1A), (1B), (1C), (1D), (1E), (1F), (1G), (1H), (1I), (1J), (1K), (1L), (1M), (1N), (1O), (1P), (1Q), (1R), (1S) and/or (1T)

$$—O—R^6—$$ (1A)

$$—S—R^6—$$ (1B)

$$—O—R^6—SO_2—R^6—$$ (1C)

$$—O—R^6—SO_2—R^6—O—R^6—$$ (1D)

$$—O—R^6—SO_2—R^6—O—R^6—R^6—$$ (1E)

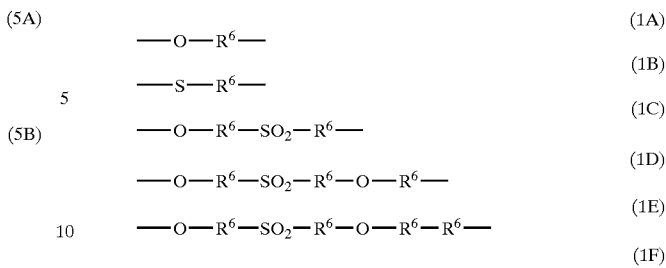
(1F)

$$—O—R^6—SO_2—R^6—R^6—SO_2—R^6—$$ (1G)

$$—O—R^6—SO_2—R^6—R^6—SO_2—R^6—O—R^6—SO_2—R^6—$$ (1H)

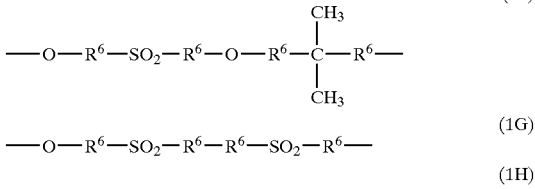
(1I)

with $0 < x, y < 100\%$
based on the number of all the repeating units $$—O—R^6—CO—R^6—$$ (1J)

$$—O—R^6—CO—R^6—CO—R^6—$$ (1K)

$$—O—R^6—CO—R^6—O—R^6—CO—R^6—CO—R^6—$$ (1L)

$$—O—R^6—O—R^6—CO—R^6—$$ (1M)

$$—O—R^6—O—R^6—CO—R^6—CO—R^6—$$ (1N)

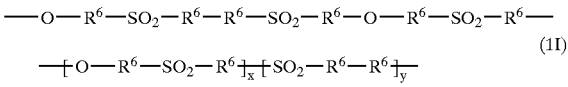
(1O)

with $0 < y < 100\%$ $$—R^6—$$ (1P)

$$—R^6—CH\!=\!CH—$$ (1Q)

$$—CHR^7—CH_2—$$ (1R)

(1S)

(1T)

in which the radicals $R^6$ independently of one another, which are identical or different, are 1,2-phenylene, 1,3-phenylene, 1,4-phenylene, 4,4'-biphenyl, a divalent radical of a heteroaromatic, a divalent radical of a $C_{10}$ aromatic, a divalent radical of a $C_{14}$ aromatic and/or a divalent pyrene radical, the radicals $R^7$, $R^8$, and $R^9$ are monovalent, tetravalent or trivalent aromatic or heteroaromatic groups, respectively, and the radicals U, which are identical within a repeating unit, are an oxygen atom, a sulfur atom or an amino group which carries a hydrogen atom, a group having 1–20 carbon atoms, preferably a branched or unbranched alkyl or alkoxy group, or an aryl group as a further radical.

3. The polymer of claim 1 further comprising being doped with acid.

4. The polymer of claim 2 further comprising being doped with acid.

5. The polymer of claim 1 wherein said polymer has a specific volume resistance of not more than 100 Ωcm at 25° C.

6. The polymer of claim 2 wherein said polymer has a specific volume resistance of not more than 100 Ωcm at 25° C.

7. The polymer of claim 1 wherein said polymer swells by less than 100% in deionized water at a temperature of 90° C.

8. The polymer of claim 2 wherein said polymer swells by less than 100% in deionized water at a temperature of 90° C.

9. The polymer of claim 1 wherein said polymer has an ion exchange capacity of between 0.5 meq/g and 1.9 meq/g, based in each case on the total mass of the polymer.

10. The polymer of claim 2 wherein said polymer has an ion exchange capacity of between 0.5 meq/g and 1.9 meq/g, based in each case on the total mass of the polymer.

11. A process for preparing the polymer of claim 1, comprises the step of reacting one or more precursor polymers, which individually or in total contain the functional groups a), b), and d), wherein a) and b) being defined as per claim 1 and d) designating sulfinate groups of the general formula (6)

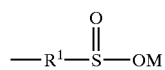
(6)

with a compound of the general formula (7)

(7)

where L is a leaving group and m is an integer greater than or equal to 2, wherein $R^1$, M, and Y being defined per claim 1.

12. The process of claim 11, wherein said precursor polymers comprise a polymer mixture of
1) at least one precursor polymer having functional groups a),
2) at least one precursor polymer having functional groups b), and
3) at least one precursor polymer having functional groups d).

13. The process of claim 11 wherein said precursor polymers comprise
1) at least one precursor polymer having functional groups a) and b) and
2) at least one precursor polymer having functional groups d).

14. The process of claim 11 wherein said precursor polymers comprise
1) at least one precursor polymer having functional groups a) and d) and
2) at least one precursor polymer having functional groups b).

15. The process of claim 11 wherein said precursor polymers comprise
1) at least one precursor polymer having functional groups a) and
2) at least one precursor polymer having functional groups b) and d).

16. The process of claim 11 wherein said precursor polymer comprises at least one polymer having functional groups of the general formula of a), b), and d).

17. The process of claim 11, wherein said precursor polymer being dissolved in a polar-aprotic solvent, preferably in N,N-dimethylformamide, N,N-dimethylacetamide, N-methylpyrrolidone, dimethyl sulfoxide or sulfolane and the solution is reacted with a halogen compound, with stirring.

18. The process of claim 17 further comprising
a) the polymer solution is spread as a film onto a substrate and
b) the solvent is evaporated where appropriate at an elevated temperature of more than 25° C. and/or under a reduced pressure of less than 1000 mbar to give a polymer membrane.

19. The process of claim 11 further comprising
a) the polymer is treated in a first step with an acid and
b) the polymer is treated in a further step with deionized water,
the polymer being treated where appropriate with an aqueous alkali prior to the first step.

20. The process of claim 11 further comprising the polymer being doped with an acid, preferably with phosphoric acid.

21. An electrochemical cell, preferably in secondary batteries, electrolysis cells, and in polymer electrolyte membrane fuel cells, especially hydrogen fuel cells and direct methanol fuel cells comprising a membrane made of the polymer of claim 1.

22. A process for membrane separation wherein membrane separation comprises gas separation, pervaporation, perstraction, reverse osmosis, nanofiltration, electrodialysis, and diffusion dialysis comprising the steps of providing a membrane made of the polymer of claim 1.

* * * * *